United States Patent
Panda et al.

(10) Patent No.: US 12,381,718 B2
(45) Date of Patent: Aug. 5, 2025

(54) SECURE EVPN WITH MKA OVER BGP

(71) Applicant: Cisco Technology, Inc., San Jose, CA (US)

(72) Inventors: Ashish Ranjan Panda, Bengaluru (IN); Pix Xu, Beijing (CN); Xiangbo Wang, Beijing (CN); Parul Seth, Delhi (IN)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 18/348,965

(22) Filed: Jul. 7, 2023

(65) Prior Publication Data

US 2025/0015976 A1 Jan. 9, 2025

(51) Int. Cl.
*H04L 9/08* (2006.01)
*H04L 9/32* (2006.01)
*H04L 12/46* (2006.01)
*H04L 45/02* (2022.01)

(52) U.S. Cl.
CPC .......... *H04L 9/0825* (2013.01); *H04L 9/3242* (2013.01); *H04L 12/4641* (2013.01); *H04L 45/02* (2013.01)

(58) Field of Classification Search
CPC . H04L 9/0825; H04L 9/3242; H04L 12/4641; H04L 45/02
See application file for complete search history.

(56) References Cited

U.S. PATENT DOCUMENTS

| | | | |
|---|---|---|---|
| 9,900,250 B2* | 2/2018 | Dong | H04L 49/354 |
| 9,985,867 B2* | 5/2018 | Dong | H04L 45/02 |
| 10,212,075 B1* | 2/2019 | Lakshmikanthan | H04L 12/4641 |
| 10,250,552 B1* | 4/2019 | Sajassi | H04L 41/0663 |
| 10,757,017 B2* | 8/2020 | Kanjariya | H04L 12/4662 |
| 11,570,179 B2* | 1/2023 | Gordon | H04L 9/083 |
| 11,601,278 B2* | 3/2023 | Gordon | H04L 63/0428 |
| 2010/0208741 A1* | 8/2010 | Vasseur | H04L 45/02 370/400 |
| 2015/0019524 A1* | 1/2015 | Fuhring | G06Q 10/06311 707/708 |
| 2016/0134526 A1* | 5/2016 | Maino | G06F 9/45558 709/226 |

(Continued)

OTHER PUBLICATIONS

Stoianov, Nikolai, et al. "Integrated security infrastructures for law enforcement agencies." Multimedia Tools and Applications 74 (2015): 4453-4468.*

(Continued)

*Primary Examiner* — Jimmy H Tran
(74) *Attorney, Agent, or Firm* — Polsinelli P.C.

(57) ABSTRACT

Techniques described herein provide procedures for reducing MACsec Key Agreement (MKA)-related traffic and improving resource allocation for MKA protocol through an EVPN environment. Techniques include leveraging Border Gateway Protocol (BGP) signaling for MKA between Provider Edge (PE) routers instead of between Customer Edge (CE) routers, which mitigates both hardware restrictions and scalability challenges with a new Xaas enablement. A new BGP-EVPN route type is defined that can communicate a set of MKA information along with an address destination associated with a provider edge device to establish a BGP MKA session and enable MACsec encryption/decryption at the provider edge device.

20 Claims, 13 Drawing Sheets

(56) References Cited

U.S. PATENT DOCUMENTS

| | | | |
|---|---|---|---|
| 2018/0109450 A1* | 4/2018 | Filsfils | H04L 45/04 |
| 2018/0248803 A1* | 8/2018 | Nagarajan | H04L 12/46 |
| 2018/0375763 A1* | 12/2018 | Brissette | H04L 61/5007 |
| 2019/0190812 A1* | 6/2019 | Verma | H04L 12/4633 |
| 2019/0288984 A1* | 9/2019 | Hajduczenia | H04L 61/5007 |
| 2020/0067812 A1* | 2/2020 | Malhotra | H04L 45/586 |
| 2020/0177503 A1* | 6/2020 | Hooda | H04L 12/4641 |
| 2020/0220843 A1* | 7/2020 | Hill | H04L 63/162 |
| 2020/0280514 A1* | 9/2020 | Zhang | H04L 12/66 |
| 2020/0358750 A1* | 11/2020 | Sharma | H04L 63/062 |
| 2020/0389469 A1* | 12/2020 | Litichever | H04L 63/145 |
| 2021/0075829 A1* | 3/2021 | Wei | H04L 63/205 |
| 2021/0168125 A1* | 6/2021 | Vemulpali | H04L 9/3236 |
| 2021/0218598 A1* | 7/2021 | Ganapathy | H04L 45/64 |
| 2021/0226816 A1* | 7/2021 | Holness | H04L 45/66 |
| 2021/0297416 A1* | 9/2021 | Gavraskar | H04L 69/28 |
| 2022/0052964 A1* | 2/2022 | Bhardwaj | H04L 47/24 |
| 2022/0131721 A1* | 4/2022 | Boutros | H04L 12/4633 |
| 2022/0217075 A1* | 7/2022 | Xie | H04L 12/4633 |
| 2022/0232009 A1* | 7/2022 | Gordon | H04L 63/08 |
| 2022/0353143 A1* | 11/2022 | Hill | H04L 41/0813 |
| 2022/0360605 A1* | 11/2022 | Baheri | H04L 41/0654 |
| 2022/0407798 A1* | 12/2022 | Holness | H04L 12/4641 |
| 2023/0008699 A1* | 1/2023 | Hill | H04L 63/0464 |
| 2023/0246950 A1* | 8/2023 | Kaimal | H04L 63/062 709/223 |
| 2023/0261963 A1* | 8/2023 | Gupta | H04L 43/12 370/537 |
| 2023/0412526 A1* | 12/2023 | Nallamothu | H04L 45/50 |
| 2024/0031908 A1* | 1/2024 | Grewal | H04L 45/741 |
| 2024/0039895 A1* | 2/2024 | Chen | H04L 47/825 |
| 2024/0195648 A1* | 6/2024 | Mishra | H04L 45/16 |
| 2024/0314066 A1* | 9/2024 | Mishra | H04L 45/42 |
| 2024/0322999 A1* | 9/2024 | Bidgoli | H04L 9/0822 |
| 2024/0348553 A1* | 10/2024 | Mishra | H04L 45/50 |

OTHER PUBLICATIONS

Mutlag, Ammar Awad, et al. "Multi-agent systems in fog-cloud computing for critical healthcare task management model (CHTM) used for ECG monitoring." Sensors 21.20 (2021): 6923.*

Birge-Lee, Henry, Maria Apostolaki, and Jennifer Rexford. "It takes two to tango: cooperative edge-to-edge routing." Proceedings of the 21st ACM Workshop on Hot Topics in Networks. 2022.*

Cisco: "Configuring Secure VXLAN EVPN Multi-Site Using Cloudsec", Apr. 19, 2023, pp. 1-18.

* cited by examiner

US 12,381,718 B2

SECURE EVPN WITH MKA OVER BGP

BACKGROUND

MACsec encryption standards describe procedures for secure multipoint communications over a Local Area Network (LAN) or a Virtual LAN (VLAN) environment. Layer 2 ethernet networks have evolved with Ethernet Virtual Private Network (EVPN), which uses Wide Area Network (WAN) protocols, being common. Currently, MACsec deployments in the case of Layer 2 Ethernet LAN (ELAN) or multipoint EVPN scenarios originate and terminate at Customer Edge (CE) devices.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
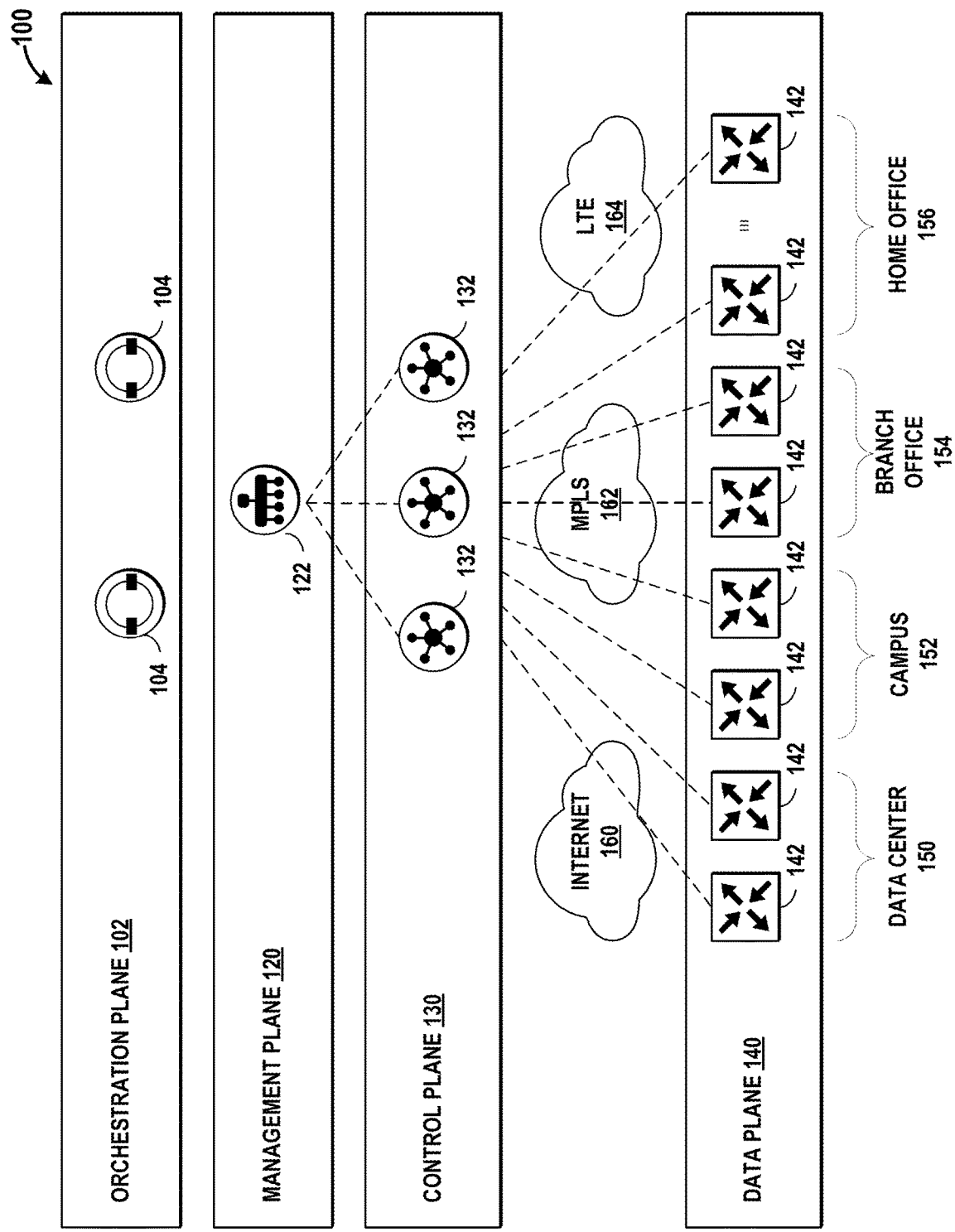
FIG. 1 illustrates an example of a high-level network architecture in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

MACsec is an encryption standard for encrypting packets at a data link layer-layer 2 (L2) of the OSI networking model—of a network. MACsec Key Agreement (MKA) protocol is used for discovering MACsec peers and negotiating keys (802.1X). Specifically, MACsec standards describe procedures for secure multipoint communications over a LAN or a VLAN environment, and are not optimized for EVPN environments. EVPN environments have become increasingly common as it offers significant advantages through multitenancy support and extensibility. In L2 VPN ELAN or multipoint EVPN scenarios, MACsec deployments originate and terminate at Customer Edge (CE) devices. This solution can be computationally expensive for CE device hardware and can also contribute to excessive bandwidth consumption as current technologies require a continual exchange of MKA traffic between CE devices.

Techniques described herein provide procedures for reducing MKA-related traffic and improving resource allocation for MKA protocol through an EVPN environment. Techniques include leveraging Border Gateway Protocol (BGP) signaling for MKA between Provider Edge (PE) routers instead of between Customer Edge (CE) routers, which mitigates both hardware restrictions and scalability challenges with a new X-as a service (XaaS) enablement. A new BGP-EVPN route type is defined that can communicate a set of MKA information along with an address destination associated with a provider edge device to establish an EVPN BGP session and enable MACsec encryption/decryption at the provider edge device.

In some aspects, a method for facilitating MKA negotiations over BGP includes: sending, by a first provider edge device of a plurality of provider edge devices of an Ethernet Virtual Private Network (EVPN) instance, a Border Gateway Protocol (BGP) discovery message to one or more remaining provider edge devices of the plurality of provider edge devices, where the BGP MKA discovery message includes MACsec Key Agreement (MKA) information; sending, by the first provider edge device and through the BGP session, the MKA information to the one or more remaining provider edge devices; establishing a BGP session between the first provider edge device and the one or more remaining provider edge devices; advertising, by the first provider edge device and using the MKA information, a Security Association Key to the one or more remaining provider edge devices of the plurality of provider edge devices; and encrypting or decrypting, at the first provider edge device and using the Security Association Key, a content message received at the first provider edge device.

In some examples, the BGP MKA discovery message is a BGP prefix advertisement descriptive of a BGP-EVPN route including the MKA information and an address destination associated with the first provider edge device. Receipt of the BGP MKA discovery message including the MKA information configures the one or more remaining provider edge devices to perform one or more functionalities associated with a MACsec encryption protocol.

The method can further include steps directed to encrypting content messages at the first provider edge device, including: receiving, at the first provider edge device and from a customer edge device in communication with the first provider edge device, the content message for communication to the one or more remaining provider edge devices of the plurality of provider edge devices; encrypting, at the first provider edge device, the content message using the Security Association Key; and communicating, at the first provider edge device, the content message to the one or more remaining provider edge devices, the content message having been encrypted using the Security Association Key.

The method can further include steps directed to decrypting content messages received at the first provider edge device, including: receiving, at the first provider edge device and from a remaining provider edge device of the plurality of provider edge devices, the content message for communication to a customer edge device in communication with the first provider edge device; decrypting, at the first provider edge device, the content message using the Security Association Key; and communicating, at the first provider edge device, the content message to the customer edge device, the content message having been decrypted using the Security Association Key.

The method can further include sending, at the first provider edge device, one or more BGP maintenance messages through a BGP session, where the one or more BGP maintenance messages maintain an "active" MKA session status associated with the first provider edge device. When applicable, the method can include assigning an "inactive" MKA session status to the first provider edge device of the plurality of provider edge devices following withdrawal of the first provider edge device from the BGP session.

In some aspects, a system for facilitating MKA negotiations over BGP includes a first provider edge device of a plurality of provider edge devices of an Ethernet Virtual Private Network (EVPN) instance, including a processor in communication with a memory and including instructions executable by the processor to: send a Border Gateway Protocol (BGP) discovery message to one or more remaining provider edge devices of the plurality of provider edge devices, the BGP MKA discovery message including MACsec Key Agreement (MKA) information; advertise, using the MKA information, a Security Association Key to the one or more remaining provider edge devices of the plurality of provider edge devices; and encrypt or decrypt, using the Security Association Key, a content message received at the first provider edge device.

In some aspects, one or more non-transitory computer-readable media includes computer-readable instructions, executable by one or more processors of a first provider edge device to: send a Border Gateway Protocol (BGP) discovery message to one or more remaining provider edge devices of the plurality of provider edge devices, the BGP MKA discovery message including MACsec Key Agreement (MKA) information; advertise, using the MKA information, a Security Association Key to the one or more remaining provider edge devices of the plurality of provider edge devices; and encrypt or decrypt, using the Security Association Key, a content message received at the first provider edge device.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for methods to improve efficiency and resource allocation for Layer 2 encryption for EVPN environments. For EVPN environments involving Customer Edge (CE) devices that connect to Provider Edge (PE) devices, which communicate with one another over an EVPN MPLS network, MKA is usually applied at the CE devices. This can be referred to as CE-to-CE MACsec encryption. Currently, CE-to-CE MACsec encryption and MKA protocols do not scale very well because each CE device would require MACsec capability on each CE, which is not cost effective. Other issues associated with CE-to-CE MACsec encryption and MKA protocols include the high computational cost of encrypting traffic at line rate on CEs, which often have limited hardware resources. Further, keepalive procedures for CE-to-CE MACsec encryption and MKA protocols involve repeated flooding of the network with keepalive messages.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An autonomous system is a network or group of networks under common administration and with common routing policies. A typical example of an autonomous system is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more autonomous systems, the network elements of the autonomous systems need to exchange routing information to various network destinations. Border Gateway Protocol (BGP) is an Exterior Gateway Protocol (EGP) that is used to exchange routing information among network elements (e.g., routers) in the same or different autonomous systems. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an autonomous system are typically coupled together by conventional "intradomain" routers configured to execute intradomain routing protocols, and are generally subject to a common authority. To improve routing scalability, a service provider (e.g., an ISP) may divide an autonomous system into multiple "areas" or "levels." It may be desirable, however, to increase the number of nodes capable of exchanging data; in this case, interdomain routers executing interdomain routing protocols are used to interconnect nodes of the various autonomous systems. Moreover, it may be desirable to interconnect various autonomous systems that operate under different administrative domains. As used herein, an autonomous system, area, or level is generally referred to as a "domain."

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for the central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, Multiprotocol Label Switching (MPLS) network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
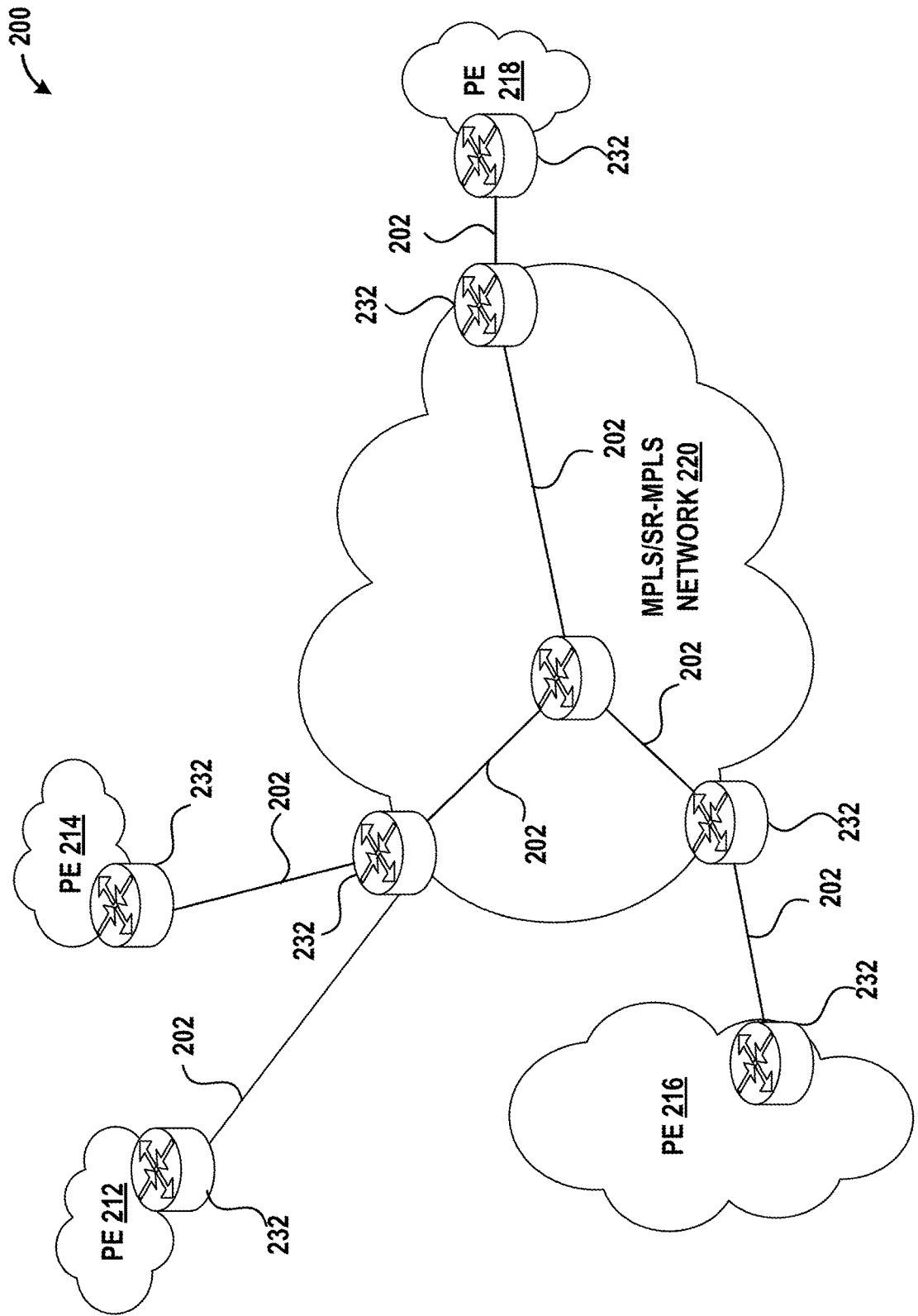
FIG. 2 illustrates an example communication network including one or more autonomous systems (ASes) in accordance with some aspects of the present technology.

FIG. 2 is a schematic block diagram of an example computer network 200 illustratively comprising network devices 214 interconnected by various methods of communication. For instance, the links 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS); in the examples outlined herein, the set of ASes can include provider edge devices (PEs) 212, 214, 216 and 218, and can further include MPLS/SR-MPLS network 220 therebetween. In some embodiments, the MPLS/SR-MPLS network 220 can support an EVPN overlay. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an autonomous system may be a collection of connected Internet Protocol (IP) routing network devices 232 under the control of one or more network operators that presents a common, clearly defined routing policy to a network (e.g., the Internet). Usually, an autonomous system comprises network devices 232 that are established on the edge of the system, and that serve as the system's ingress and egress points for network traffic. Moreover, the network devices 232 may be considered edge network devices, border routers, or core network devices within the respective autonomous system. These network devices typically, but not always, are routers or any other element of network infrastructure suitable for switching or forwarding data packets according to a routing protocol or switching protocol. For the purposes of the present disclosure, the network devices 232 located within an autonomous system may alternatively be referred to as "forwarding network devices" or "intermediate network devices." Moreover, for illustration purposes, the ASes (e.g., PEs 212, 214, 216, 218, and MPLS/SR-MPLS network 220) are shown with a limited number of network devices 232. In an actual implementation, however, an autonomous system normally includes numerous routers, switches, and other elements.

Each AS (e.g., PEs 212, 214, 216, 218, and MPLS/SR-MPLS network 220) may be associated with an Internet Service provider (ISP). Even though there may be multiple autonomous systems supported by a single ISP, the Internet only sees the routing policy of the ISP. That ISP has an officially registered Autonomous System Number (ASN). As such, a unique ASN is allocated to each autonomous system for use in BGP routing. ASNs are important primarily because they uniquely identify each network on the Internet.

To facilitate the routing of network traffic through the autonomous systems, or more specifically, the network devices 232 within the autonomous systems, the network devices may exchange routing information to various network destinations. As described above, BGP is conventionally used to exchange routing and reachability information among network devices 232 within a single autonomous system or between different autonomous systems. The BGP logic of a router is used by the data collectors to collect BGP autonomous system path information, e.g., the "AS_PATH" attribute, as described further below, from BGP tables of border routers of an autonomous system, to construct paths to prefixes.

To exchange BGP routing information, two BGP hosts (network devices 232), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of autonomous systems, e.g., links 202, may be referred to as an "AS_PATH." The AS_PATH attribute indicates the list of autonomous systems that must be traversed to reach the address destination. For example, as illustrated in FIG. 2, the PE 218 may store an AS_PATH attribute of "212 220 218" where the address destination is the PE 218 (or a particular IP address within PE 218). Here, the AS_PATH attribute indicates that the path to the address destination PE 218 from PE 212 passes through PE 214, and MPLS/SR-MPLS network 220 and to PE 218, in that order.

Although it may be preferable that all network devices 232 in the respective ASes (e.g., PEs 212, 214, 216, 218, and MPLS/SR-MPLS network 220) be configured according to BGP, in a real-world implementation, it may be unlikely that each network device communicates using BGP. Thus, the disclosed embodiments are applicable to scenarios where all network devices 232 in the computer network 200 are configured according to BGP, as well as scenarios where only a subset of the network devices 232 are configured as such.

Moreover, a security extension to the BGP has been developed, referred to as BGPSEC, which provides improved security for BGP routing. BGP does not include mechanisms that allow an autonomous system to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an autonomous system number to a public signature verification key, the corresponding private key of which is held by one or more BGP speakers within that autonomous system. Private keys corresponding to public keys in such certificates can then be used within BGPSEC to enable BGP speakers to sign on behalf of their autonomous system. The certificates thus allow a relying party to verify that a BGPSEC signature was produced by a BGP speaker belonging to a given autonomous system. Thus, a goal of BGPSEC is to use signatures to protect the autonomous system Path attribute of BGP update messages so that a BGP speaker can assess the validity of the autonomous system Path in update messages that it receives. It should be understood, however, that the embodiments for implementing autonomous system Path security disclosed herein are not limited to BGPSEC; certain embodiments may, additionally or alternatively, be applicable to other suitable protocols, including, for example, SoBGP, S-BGP, and PGPBGP, to name just a few.

EVPN (Ethernet Virtual Private Network) is a technology for building virtual private networks (VPNs) using Ethernet Virtual Connections (EVCs) instead of traditional Layer 3 IP VPNs. It allows service providers to offer a wide range of Layer 2 and Layer 3 VPN services to customers over a common infrastructure, using Multiprotocol Label Switching (MPLS) or Virtual Extensible LAN (VXLAN) as the underlying transport technology. Corresponding with various systems and methods discussed herein, the MPLS/SR-MPLS networks (e.g., MPLS/SR-MPLS network 162 of FIG. 1, MPLS/SR-MPLS network 220 of FIG. 2) can operate under EVPN; likewise, the provider edge devices (e.g., PEs 212, 214, 216, 218 of FIG. 2) can communicate with associated sources over individual EVPN instances as discussed herein. EVPN allows for the creation of a single Layer 2 or Layer 3 VPN domain that can span multiple sites, such as data centers or remote offices. This allows for the creation of a virtual LAN (VLAN) or virtual private wire service (VPWS) that can connect multiple sites together as if they were on the same physical LAN.

EVPN also supports several advanced features such as Virtual Private LAN Service (VPLS), which allows for the creation of a full mesh of Layer 2 VPN connections between multiple sites, and Any-to-Any communication within the VPN. Additionally, EVPN also supports BGP-based auto-discovery and signaling, which simplifies the configuration and management of VPNs.

EVPN is a powerful technology that offers many benefits over traditional IP VPNs. It allows for more efficient use of network resources, better scalability, and more advanced features such as VPLS and Any-to-Any communication. It is a good solution for service providers looking to offer advanced VPN services to their customers, as well as for enterprise customers looking to connect multiple sites together over a virtual private network.

For clarity of explanation, in some instances the present technology may be presented as including individual functional blocks including functional blocks comprising devices, device components, steps or routines in a method embodied in software, or combinations of hardware and software.

MKA for EVPN

FIGS. 3A-3F show various EVPN environments 330A-330F, including a plurality of customer edge (CE) devices (e.g., a first CE device "CE1" 320A, a second CE device "CE2" 320B, and a third CE device "CE3" 320C, hereinafter "CEs" 320A-320C) in communication with one another over an MPLS (or SR-MPLS) network 302 for communication of information between one another. As shown, each CE 320A-320C can be connected to the MPLS network 302 by one or more provider edge (PE) devices (provider edge "routers", PEs 212, 214, 216 and 218 shown in FIG. 2), hereinafter, "PEs" 330A-330C. In the simplified example shown, the MPLS network 302 communicates with three PEs (e.g., a first PE "PE1" 330A, a second PE "PE2" 330B, a third PE "PE3" 330C); where PE1 330A communicates with CE1 320A, PE2 330B communicates with CE2 320B, and PE3 330C communicates with CE3 320C.

Figure 3A:
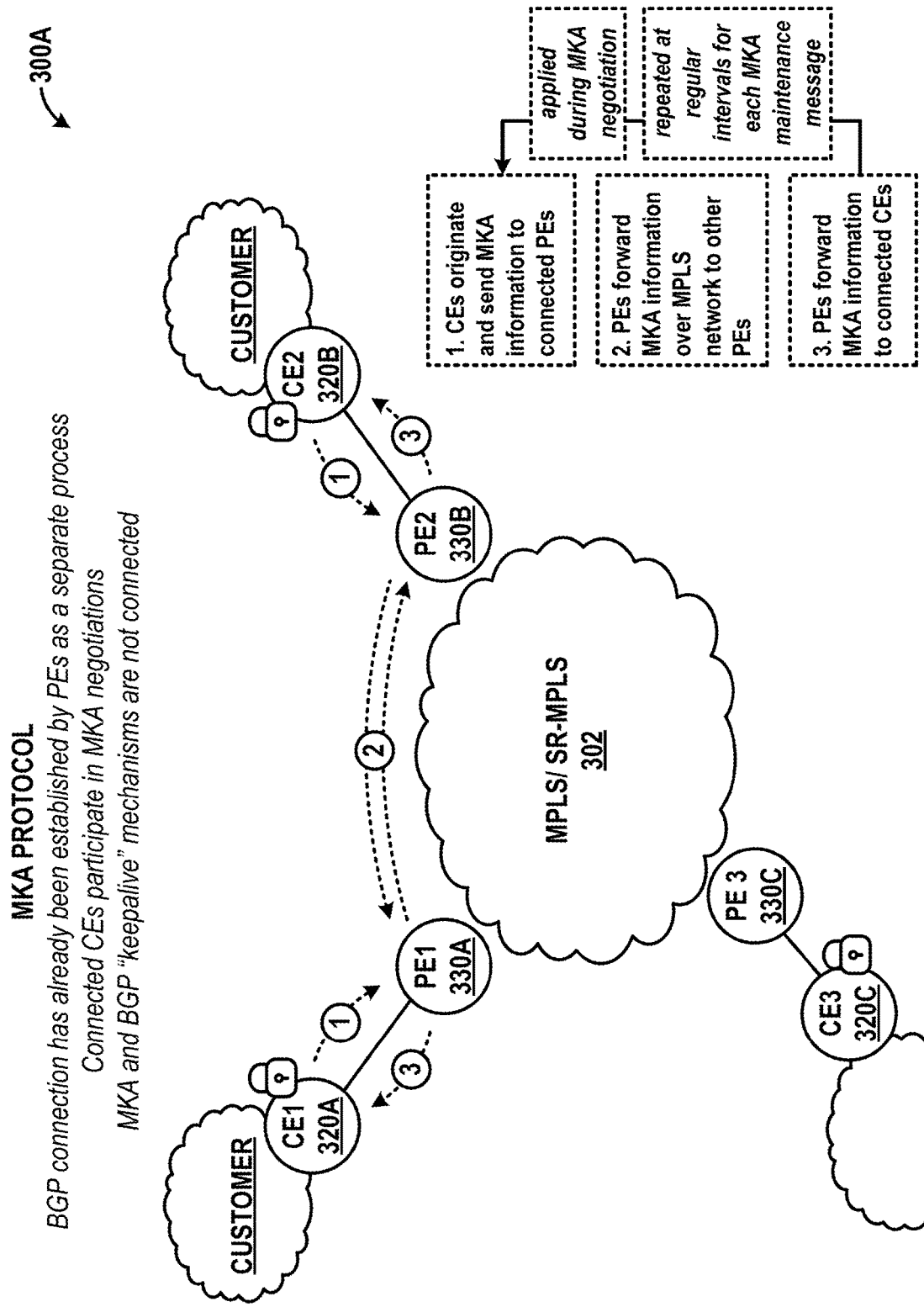
FIG. 3A illustrates an EVPN environment including a plurality of customer edge devices that facilitate MKA negotiations through an MPLS/SR-MPLS network.

The following discussion with respect to FIG. 3A first relates the current functionalities for facilitating MKA over EVPN, which are primarily performed at the CEs (e.g., CEs 320A-320C).

Following, the present disclosure provides a description of various functionalities for facilitating MKA over EVPN that can be implemented at PEs 330A-330C shown with reference to FIGS. 3B-7B.

MKA Protocol: Previous Methods

For EVPN environments such as EVPN environment 300A shown in FIG. 3A, MKA is usually applied at the CEs 320A-320C indicated by the lock icon.

Encrypting traffic at line rate on the CEs 320A-320C demands a lot of hardware resources. For example, traffic encryption can be expected consume about 10 Gbps of bandwidth on the CEs 320A-320C, and can increase to about 100 Gbps for cloud providers. CEs 320A-320C are often inexpensive and do not have the hardware capability to process traffic at a line rate. The PEs 330A-330C have the necessary hardware resources, but the nature of MACsec architecture has posed challenges for originating MACsec MKA negotiation from the PEs 330A-330C.

Figure 3B:
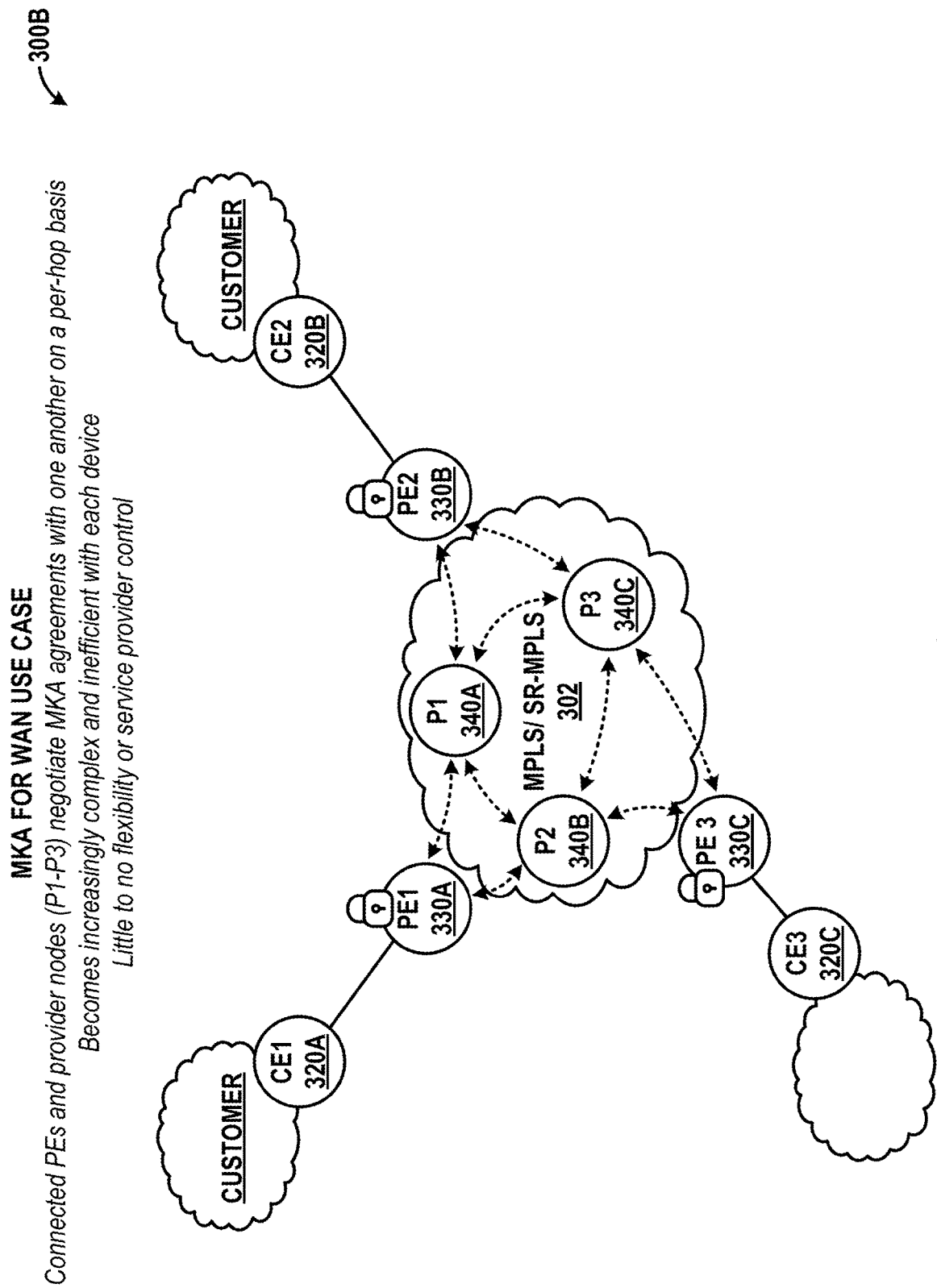
FIG. 3B illustrates an EVPN environment for a WAN use case including a plurality of provider edge devices that facilitate MKA negotiations on a per-hop basis through an MPLS/SR-MPLS network.

EVPN environment 300B shown in FIG. 3B shows an example WAN-based MACsec use case in which previous technologies have applied MKA at the PEs 330A-330C. FIG. 3B also includes additional provider nodes 340A-340C (P1-P3) within the MPLS network 302 as shown. For this arrangement, individual MKA agreements are established and maintained on a "per-hop" basis between each respective node, including PEs 330A-330C and provider nodes 340A-340C. This can become increasingly complex and inefficient with each device within the EVPN environment 300B. Further, this arrangement which encrypts all data irrespective of any service (L2VPN, L3VPN) offered by the PE routers using these links and does not allow control from service providers. Further, these methods do not provide the PEs 330A-330C with session initiation capabilities offering MACsec services per L2VPN/EVPN.

As such, alternative solutions such as per-hop MACsec sessions in MPLS core layer (for PE-P/PE-PE MACsec encryption) are not flexible or service-aware, and service providers do not have a per L2VPN control for MACsec.

MKA Protocol: Present Solution

Figure 3C:
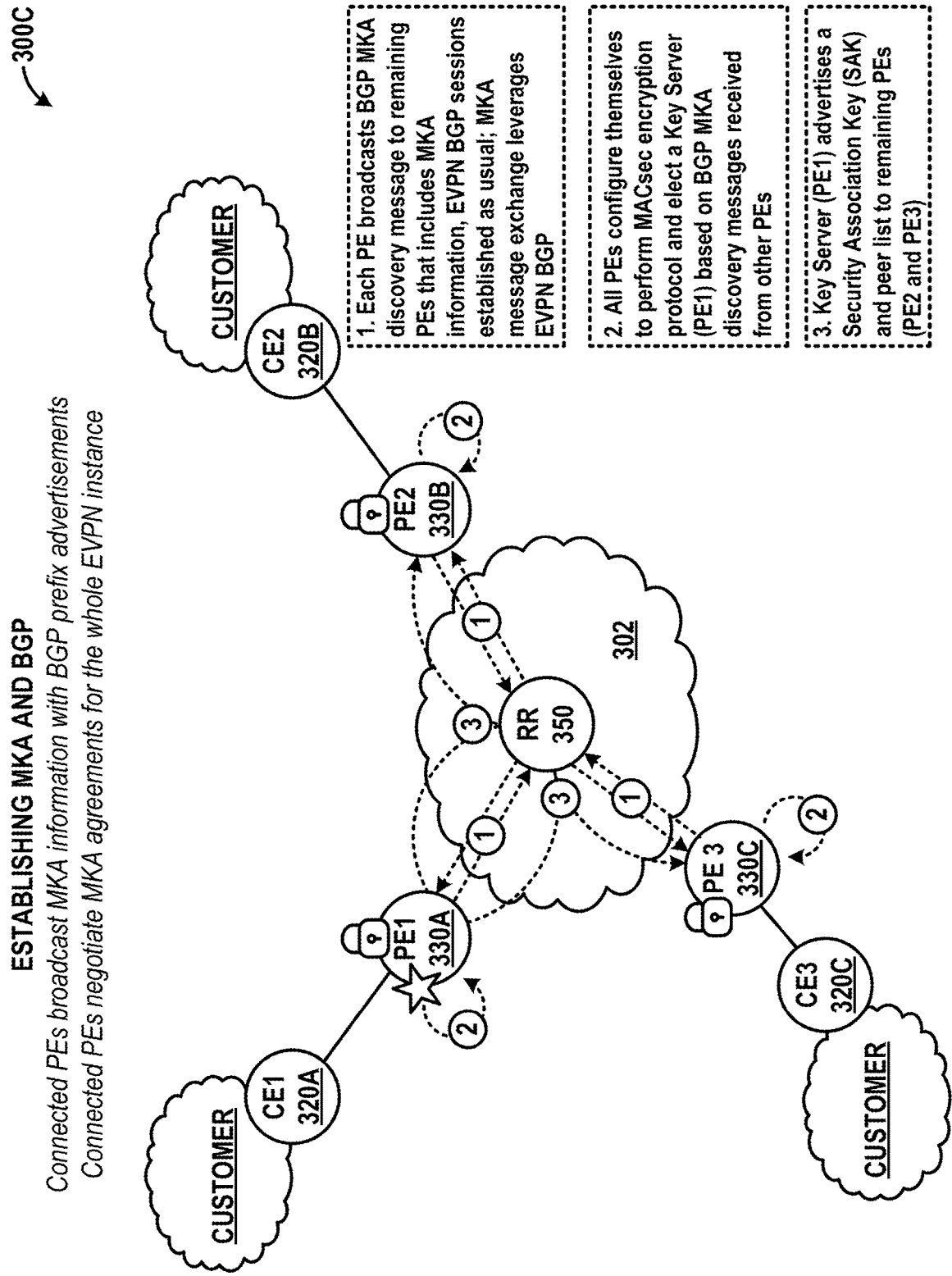
FIG. 3C illustrates an EVPN environment including a plurality of provider edge devices that leverages a BGP signaling framework to handle MKA negotiations through an MPLS/SR-MPLS network in accordance with some aspects of the present technology.

In contrast, with reference to FIG. 3C, the present disclosure is directed to improving resource allocation and efficiency for MKA protocol implementation within an EVPN environment (e.g., EVPN environment 300C). The solution outlined herein solves the aforementioned problems by leveraging BGP-EVPN prefix advertisement (a staple of EVPN networks) as a vehicle for MACsec key management between PEs (e.g., PEs 330A-330C) of the same EVPN instance that is providing MACsec service to corresponding CEs 320A-320C. The PEs 330A-330C can use BGP as the transport for all MKA negotiations.

BGP-EVPN prefix advertisement is applied within EVPN, and allows PEs of a common EVPN instance to "discover" one another by broadcasting their identifying prefixes to one another. The present disclosure outlines a modification to BGP-EVPN prefix advertisement to also include MACsec information. In particular, the present disclosure introduces a new BGP-EVPN route type conducive for carrying the MACsec information and enabling PEs to perform MACsec functionalities.

This transfers the burden of applying MACsec encryption and facilitating MKA negotiations to the PEs rather than the CEs, and allows use of the existing BGP (border gateway protocol) advertisement framework to communicate MACsec information between peers of the same EVPN instance rather than having a separate communication line open and maintained for MKA negotiations.

In some examples, a route reflector (RR) 350 can be included within the EVPN environment 300C-300F that can handle intermediate communication between respective PEs, and may be included as a node that can receive broadcasts from the PEs including BGP MKA discovery or withdrawal messages, messages from PEs elected as Key Server that include peer lists and SAK, and encrypted messages for routing across the MPLS network 302.

In instances where there is no RR 350 available, PEs can communicate with one another over the EVPN environment directly or through another device, such as a central controller node or one or more proxy nodes.

Establishing MKA and BGP

FIG. 3C shows the EVPN environment 300C where MKA is applied at the PEs 330A-330C (indicated by the lock icon) and leverages the BGP signaling framework to handle MKA negotiations.

In this example, at circle (1) of FIG. 3C, each PE sends a MKA discovery message inside a BGP update frame to one or more remaining provider edge devices or to the route reflector to discover and negotiate MKA parameters. From the perspective of the first PE 330A, the first PE 330A sends a BGP MKA discovery message to the second PE 330B and the third PE 330C. BGP session (EVPN address-family) is established between the first PE 330A, the second PE 330B and the third PE 330C as usual prior to the MKA discovery. MKA message exchange leverages the same BGP session.

Importantly, the BGP MKA discovery message includes the MKA information for MACsec encryption. The BGP MKA discovery message originated and sent by the first PE 330A can be a BGP prefix advertisement descriptive of a BGP-EVPN route which carries the EVPN information (e.g., an address destination associated with the first PE 330A) and MKA information within BGP-based signaling. The proposed solution sets the new route type to "evpn-mka", with a variable length as per MKA negotiation fields length Table 1A shows BGP EVPN Network Layer Reachability Information (NLRI) as defined in [RFC7432], having a field for Route Type. Table 1B shows the BGP-EVPN route type "evpn-mka" that carries the EVPN information and the MKA information within BGP-based signaling. Table 1C shows a BGP Prefix Update with MKA Information. Table 1D shows a non-limiting listing of some important MKA parameters that are carried inside the evpn-mka route NLRI value fields.

TABLE 1A

BGP EVPN NLRI per [RFC7432]

Route Type (1 octet)
Length (1 octet)
Route Type specific (variable length)

TABLE 1B evpn-mka for MKA negotiation over BGP signalling

RD (8 octet)
Ethernet Segment ID (10 octet)
Ethernet Tag ID (4 octets)
MKA length (1 octet)
MKA value (variable length as per MKA negotiation)

TABLE 1C

BGP Prefix Update with MKA Information

Ethernet
IP
TCP
BGP Update
MKA (see Table 1B)

TABLE 1D

Select MKA parameters carried within evpn-mka BGP route NLRI fields

EVPN Per EVI RD (Node + EVI) - globally unique RD specific for EVI instance
EVPN ESI - Ethernet Segment Identifier
CKN - Key name
CAK - Key value
Key Server Priority
Key Server = true/false
Local ID and peer ID lists
SCI - Secure Channel Identifier
ICV - Integrity check Validation In this solution, all BGP peers (e.g., PEs) that are part of the same EVPN advertise the evpn-mka BGP route type that includes both EVPN and MKA parameters.

At circle (2) of FIG. 3C, upon receipt of the BGP MKA discovery messages from other PE, each respective PE configures itself to perform MACsec encryption protocol using the MKA information. The PEs elect one PE from the group as a Key Server using the MKA information; the Key Server is elected based on a priority value for each PE within the MKA information indicating a priority order for which PE is to be selected as the Key Server. From the perspective of the first PE 330A, the first PE 330A receives BGP MKA discovery messages with MKA information from the second PE 330B and the third PE 330C. In this example, the first PE 330A is designated the Key Server, indicated in FIG. 3C by a star icon.

At circle (3) of FIG. 3C, the PE designated as Key Server advertises a Security Association Key and a peer list to the remaining PEs. In this example, the first PE 330A advertises, using the set of MKA information, the SAK and the peer list to the second PE 330B and the third PE 330C.

As such, the solution outlined in FIG. 3C and Tables 1A-1B does not aim to alter the current MKA standards and parameters, rather, the solution aims to use existing BGP-EVPN signaling procedures to communicate the pertinent information using current MKA standards and parameters. With key management moving from CEs to PEs, secure EVPN with MACsec as a service can be provided by the Service Provider, without hardware dependency on end customers for encryption. Further, this solution provides advantages in terms of key granularity, enabling support for keys per Ethernet Segment (ESI), Attachment Circuit (AC), L2 flow-based secure channel, etc.

Further advantages include improvement in overall scalability. For example, consider an EVPN instance with 1000 CEs. Under existing approaches, 1000 individual MKA sessions would be required. In contrast, with the approach outlined with respect to FIG. 3C, MACsec can be implemented using only 1 BGP session for all 1000 CEs based on different EVPN and key granularity.

Accounting for Updates/Revocation/Renewal of Keys Over BGP

The key management approach is similar to the MACsec MKA algorithm with changes to reduce prefix flooding for liveness indication. Updates, revocation and/or renewal of keys can be handled at the PEs from a software implementation perspective. In general, there can be two separate processes, MKA and BGP to manage the respective responsibilities of each. Both MKA and BGP coordinate with one another to achieve the required goals.

BGP EVPN MKA Discovery:

In this implementation, MKA processes can still generate frames (where a "frame" is a unit of measurement for data carried at the L2 or data link layer) similar to current MKA technologies involving 802.1x transport. However, instead of handing the frames off to 802.1x related process, MKA processes running on a PE hand the frames over to a BGP process running on the PE. The BGP process interprets the frames and maps to relevant Type Length Values (TLV) as per a BGP-EVPN MKA route type defined herein and creates a BGP "update" message for broadcasting to one or more remaining PEs. Upon receipt of the BGP update message, the one or more remaining PEs interpret the information, apply a reverse translation to map TLVs to MKA-related syntax, and hand over the information to the MKA process. This helps in MKA key server discovery and session set-up.

Figure 3D:
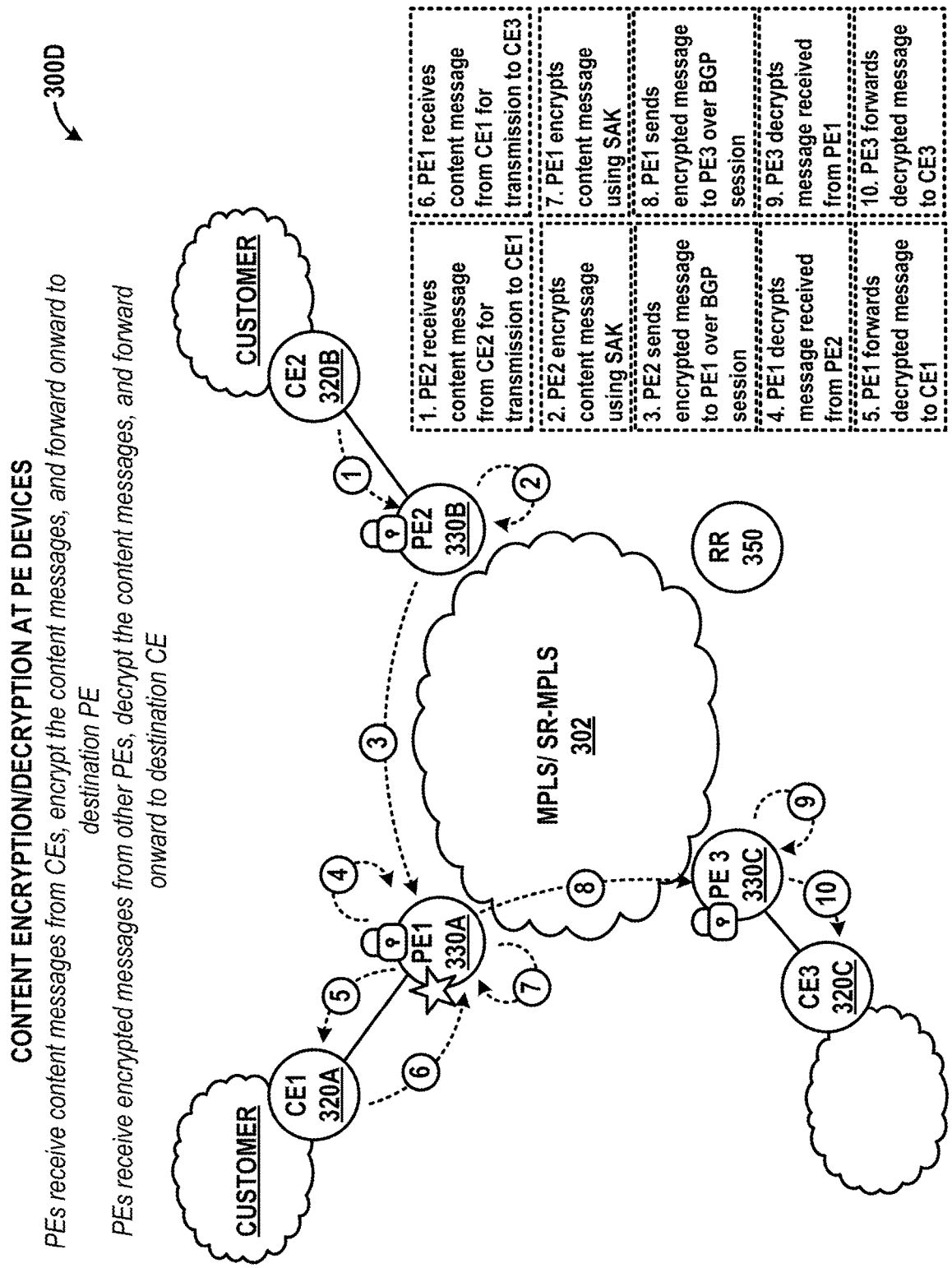
FIG. 3D illustrates the EVPN environment of FIG. 3C applying content message encryption and decryption at the provider edge devices in accordance with some aspects of the present technology.
Figure 3E:
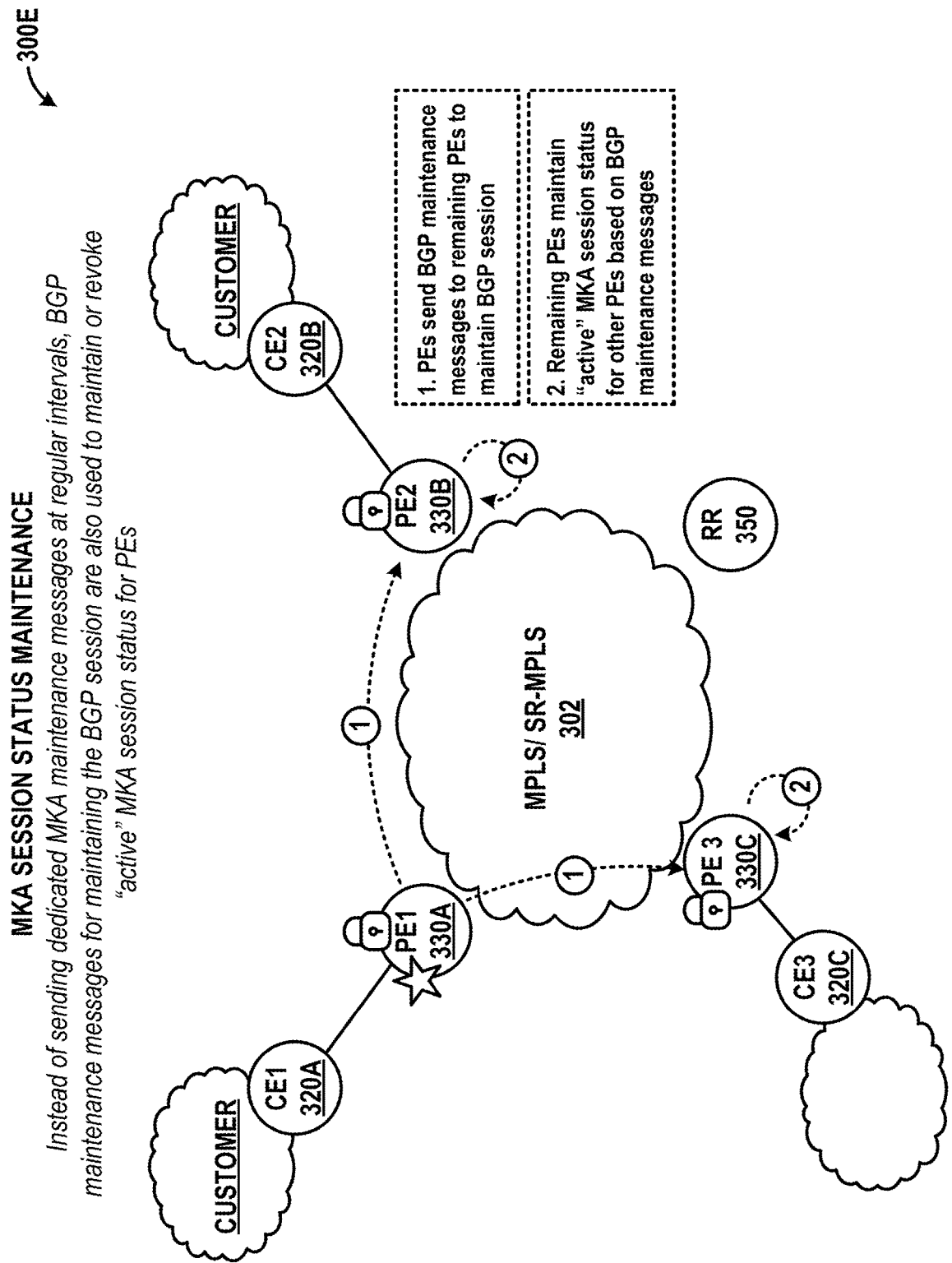
FIG. 3E illustrates the EVPN environment of FIG. 3C maintaining "active" MKA session status in accordance with some aspects of the present technology.
Figure 3F:
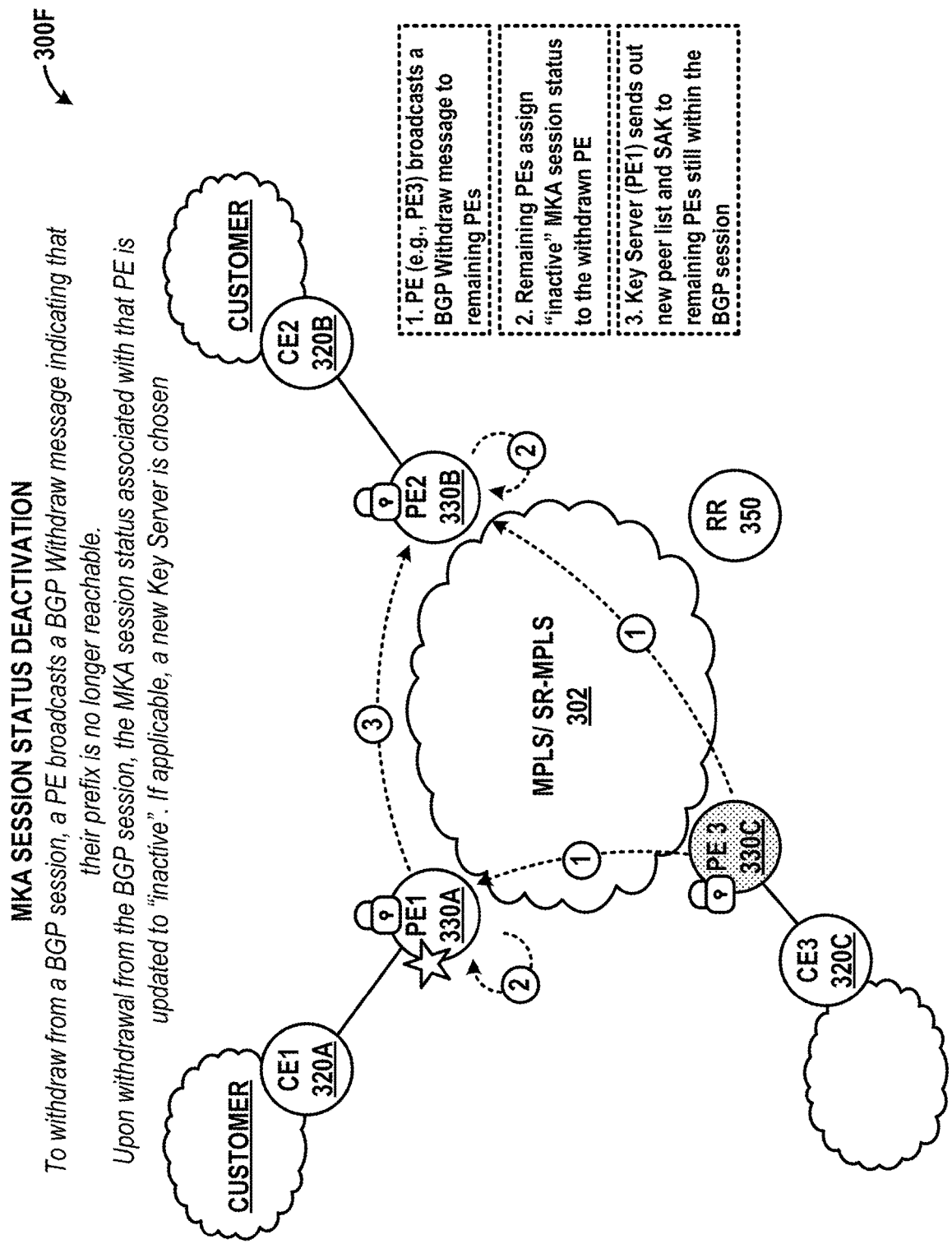
FIG. 3F illustrates the EVPN environment of FIG. 3C when one of the PEs withdraw from the BGP session in accordance with some aspects of the present technology.

FIGS. 3D-3F show further functionalities of this arrangement, continuing with the example of FIG. 3C.

Content Encryption/Decryption at PE Devices

FIG. 3D shows the EVPN environment 300D when content is being sent across the MPLS network 302 and MKA negotiations have already been established between the first PE 330A, the second PE 330B, and the third PE 330C (e.g., through the arrangement shown in FIG. 3C). In general, a PE can receive content messages from its associated CE, encrypt the content message, and forward the encrypted content messages onward to a destination PE. Upon receipt of the encrypted content messages, the destination PE can decrypt the encrypted content messages and forward the decrypted content message onward to an associated destination CE.

In the example of FIG. 3D, circles (1)-(5) are directed to receiving and decrypting messages with respect to the first PE 330A. Circles (6)-(10) are directed to encrypting and sending messages with respect to the first PE 330A.

At circle (1) of FIG. 3D, the second PE 330B receives a content message from the second CE 320B for transmission to the first CE 320A. At circle (2), the second PE 330B encrypts the content message using the SAK obtained from the Key Server in FIG. 3C. At circle (3), the second PE 330B sends the encrypted content message to the first PE 330A over the MPLS network 302 through the EVPN (MPLS/SR-MPLS) established between. At circle (4), the first PE 330A decrypts the encrypted message received from the second PE 330B. At circle (5), the first PE 330A forwards the decrypted message onward to the first CE 320A.

At circle (6) of FIG. 3D, the first PE 330A receives a content message from the first CE 320A for transmission to the third CE 320C. At circle (7), the first PE 330A encrypts the content message using the SAK established in FIG. 3C. At circle (8), the first PE 330A sends the encrypted content message to the third PE 330C over the MPLS network 302 through the EVPN established between. At circle (9), the third PE 330C decrypts the encrypted message received from the first PE 330A. At circle (10), the third PE 330C forwards the decrypted message onward to the third CE 320C.

MKA Session Status Maintenance

FIG. 3E shows the EVPN environment 300E maintaining an "active" MKA session status for the first PE 330A. Instead of sending dedicated MKA maintenance messages at regular intervals, the arrangement of FIGS. 3C and 3E enable the use of BGP maintenance messages (that are standard practice for maintaining BGP sessions) and are also used to maintain or revoke "active" MKA session status for PEs. At circle (1) of FIG. 3E, the first PE 330A sends BGP maintenance messages to the second PE 330B and the third PE 330C to maintain the BGP session. Upon receipt of the BGP maintenance messages from the first PE 330A, the second PE 330B and the third PE 330C maintain an "active" MKA session status for the first PE 330A for that interval unless there is a BGP evpn-mka route withdrawal received for PE 330A. Likewise, "active" MKA status can also be maintained for the second PE 330B and the third PE 330C in the same manner (e.g., using the BGP maintenance messages).

One aim of the present disclosure is to have a more efficient keepalive mechanism for the MKA process, as opposed to flooding the network with BGP updates and dedicated MKA maintenance messages when not required. Once the BGP session is set up, the MKA process running on a PE sends keepalive messages to the BGP process running on the PE that inform the BGP process that the PE is an active local endpoint. Likewise, the local BGP process running on the PE sends a keepalive to the local MKA process running on the PE. For remote PEs, an MKA status of the PE can be maintained as "active" as long as the evpn-mka BGP route is available (not withdrawn).

MKA Session Status Deactivation

FIG. 3F shows the EVPN environment 300F when one of the PEs withdraw from the BGP session. When a PE no longer needs to participate in the MKA process, the MKA process sends a teardown signal to the BGP process. The BGP process in response generates a "withdraw" message and sends it to a route reflector (shown in FIG. 4). All MKA processes associated with the remaining PEs can then update their MKA information accordingly. To withdraw from a BGP session, a PE broadcasts a BGP Withdraw message indicating that their prefix is no longer reachable. For the arrangement of FIGS. 3C and 3F, upon withdrawal of a PE from the BGP session, the MKA session status associated with that PE is updated to "inactive". If applicable, a new Key Server is chosen.

Figure 4:
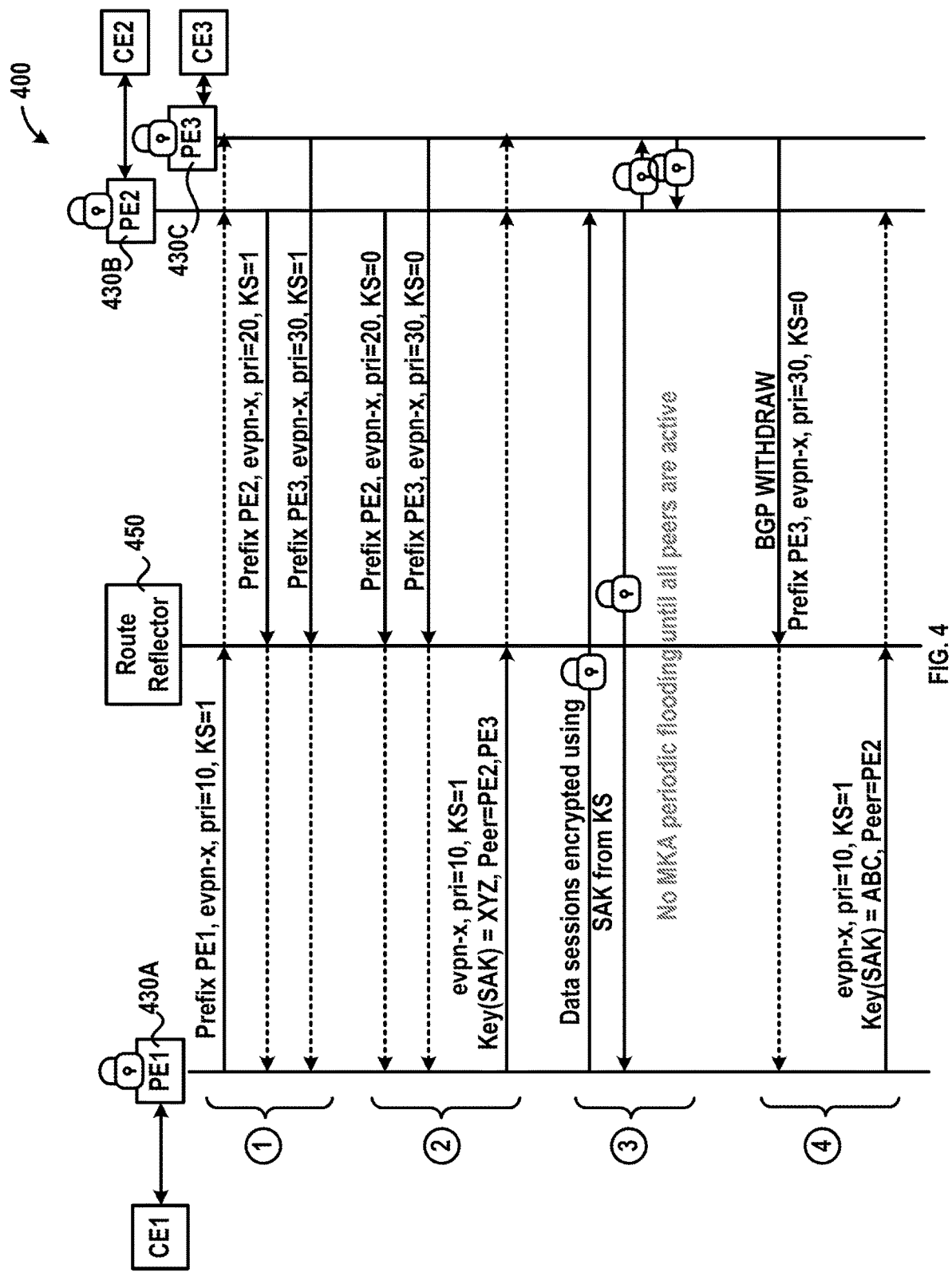
FIG. 4 illustrates a sequence diagram for handling MKA negotiations over BGP framework in accordance with some aspects of the present technology.

In the example of FIG. 3F, the third PE 330C is shown withdrawing from the BGP session (e.g., to remain consistent with an example outlined herein with respect to FIG. 4). However, the steps shown in FIG. 3F can be similarly applied with respect to the first PE 330A or the second PE 330B.

At circle (1) of FIG. 3F, the third PE 330C broadcasts a BGP Withdraw message to the first PE 330A and the second PE 330B. At circle (2), upon receipt of the BGP Withdraw message, the first PE 330A and the second PE 330B update an MKA session status for the third PE 330C to be "inactive". At circle (3), the Key Server (e.g., the first PE 330A)

sends out a new SAK and a new peer list to the remaining PEs, which in this example would only include the second PE 330B.

MKA Sequence Diagram

FIG. 4 shows a sequence diagram 400 for BGP-based MKA, continuing with the systems and methods outlined in FIGS. 3C-3F.

The sequence diagram 400 shows a first PE 430A, a second PE 430B and a third PE 430C that belong to a common EVPN instance (e.g., such as EVPN environment 300C shown in FIG. 3C). In this example, a route reflector 450 of the common EVPN instance can be an intermediary between the first PE 430A, the second PE 430B and the third PE 430C.

Circle (1) of FIG. 4 shows a grouping of sub-steps corresponding to a BGP EVPN MKA discovery phase of the sequence diagram 400 in which the participating PEs within the same EVPN instance discover each other and key server priority through the evpn-mka BGP route. Initially, all PEs set key server (KS) bit to 1. The first PE 430A sends a BGP MKA discovery message to the second PE 430B and the third PE 430C that includes a BGP prefix advertisement descriptive of an evpn-mka BGP route carrying MKA information and an address destination associated with the first PE 430A (generally indicated in FIG. 4 as "Prefix PE1, evpn-x, pri=10, KS=1", indicating a priority value of 10 for the first PE 430A and the KS bit set to a first value (e.g., "1" or "true") by default). The route reflector 450 can ensure that this information reaches the second PE 430B and the third PE 430C. The first PE 430A also receives BGP MKA discovery messages from the second PE 430B and the third PE 430C, having evpn-mka BGP routes respectively indicated in FIG. 4 as "Prefix PE2, evpn-x, pri=20, KS=1" and "Prefix PE3, cvpn-x, pri=30, KS=1". By communication of the BGP MKA discovery messages, MKA parameters can be discovered and negotiated between the first PE 430A, the second PE 430B and the third PE 430C.

Circle (2) of FIG. 4 shows a grouping of sub-steps corresponding to a Key Server (KS) election and SAK advertisement phase of the sequence diagram 400 in which the node with the lowest KS priority value is elected as the KS. If the same KS priority value is advertised by multiple PE, the PE with the lowest Secure Channel Identifier value is elected as the KS. Upon receipt of BGP MKA discovery messages from other PEs, each PE can unanimously determine which PE is the KS. In the example, the first PE 430A has the lowest KS priority value of pri=10, so the first PE 430A is selected as the KS. As such, the second PE 430B and the third PE 430C can each set the KS bits to a second value (e.g., "0" or "false") as they are not selected as the KS and send out updated evpn-mka BGP routes showing the KS bits updated to "0". Following election, the first PE 430A, as the KS, can send out an updated evpn-mka BGP route that advertises a SAK and a peer list using the MKA information (indicated within FIG. 4 as "cvpn-x, pri=10, KS=1, Key (SAK)=XYZ, Peer=PE2,PE3"). The second PE 430B and the third PE 430C receive this updated evpn-mka BGP route and accept the SAK. The first PE 430A, the second PE 430B and the third PE 430C can then use the same SAK for encryption and decryption.

Circle (3) of FIG. 4 shows sub-steps corresponding to a content communication phase of the sequence diagram 400 in which the first PE 430A, the second PE 430B and the third PE 430C communicate with one another over their corresponding EVPN. In this phase, content messages from EVPN data sessions are encrypted and decrypted at the PEs in accordance with the approach outlined in FIG. 3D. During this phase, each PE sends one or more BGP maintenance messages through the BGP session. Importantly, one or more BGP maintenance messages are used to maintain an "active" MKA session status associated with each respective PE. Until an evpn-mka BGP route is withdrawn, the associated peers can be considered "live" or "active".

Circle (4) of FIG. 4 shows a grouping of sub-steps corresponding to a peer withdrawal phase of the sequence diagram 400 in which the third PE 430C withdraws from the MKA session. This may happen if the third PE 430C (and/or the CE device associated with the third PE 430C) is down or if it does not need encryption. The third PE 430C broadcasts a BGP Withdraw message to the first PE 430A indicating that it is withdrawing from the MKA session. In response, the first PE 430A can send out another updated evpn-mka BGP route that advertises a new SAK and a new peer list using the MKA information (indicated within FIG. 4 as "cvpn-x, pri=10, KS=1, Key (SAK)=ABC, Peer=PE2"). The new SAK can be accepted by the second PE 430B for encryption and decryption. The new peer list removes reference to the third PE 430C. Further, upon withdrawal, an MKA session status associated with the third PE 430C can be set to "inactive".

While the steps shown with respect to circle (4) of FIG. 4 are discussed in terms of the third PE 430C withdrawing from the MKA session, the steps can similarly be applied to the first PE 430A or the second PE 430B. If the first PE 430A (as the KS) withdraws from the MKA session, then a new KS election must take place. Consistent with the steps outlined with respect to circle (2) of FIG. 4, if the first PE 430A withdraws, then the second PE 430B becomes the new KS (by virtue of having the lower KS priority value) and sends a new SAK and a new peer list using the MKA information. The new peer list can remove reference to the first PE 430A.

To add a new peer (e.g., a fourth PE) to the BGP session, the new peer can advertise a new evpn-mka route inside a BGP update message including the MKA information to the first PE 430A, the second PE 430B and the third PE 430C or to the Route Reflector in a single message. If necessary (e.g., in cases where the KS priority value of the fourth PE is less than the KS priority value of the first PE 430A), the KS election and subsequent steps can be performed again. Otherwise, upon receipt of the BGP MKA discovery message from the fourth PE, the first PE 430A (as the KS) can send out an updated evpn-mka BGP route that advertises a new SAK and a new peer list using the MKA information. The new SAK can be accepted by the second PE 430B, the third PE 430C, and the fourth PE for encryption and decryption. The new peer list can add a reference to the fourth PE.

Methods

Figure 5A:
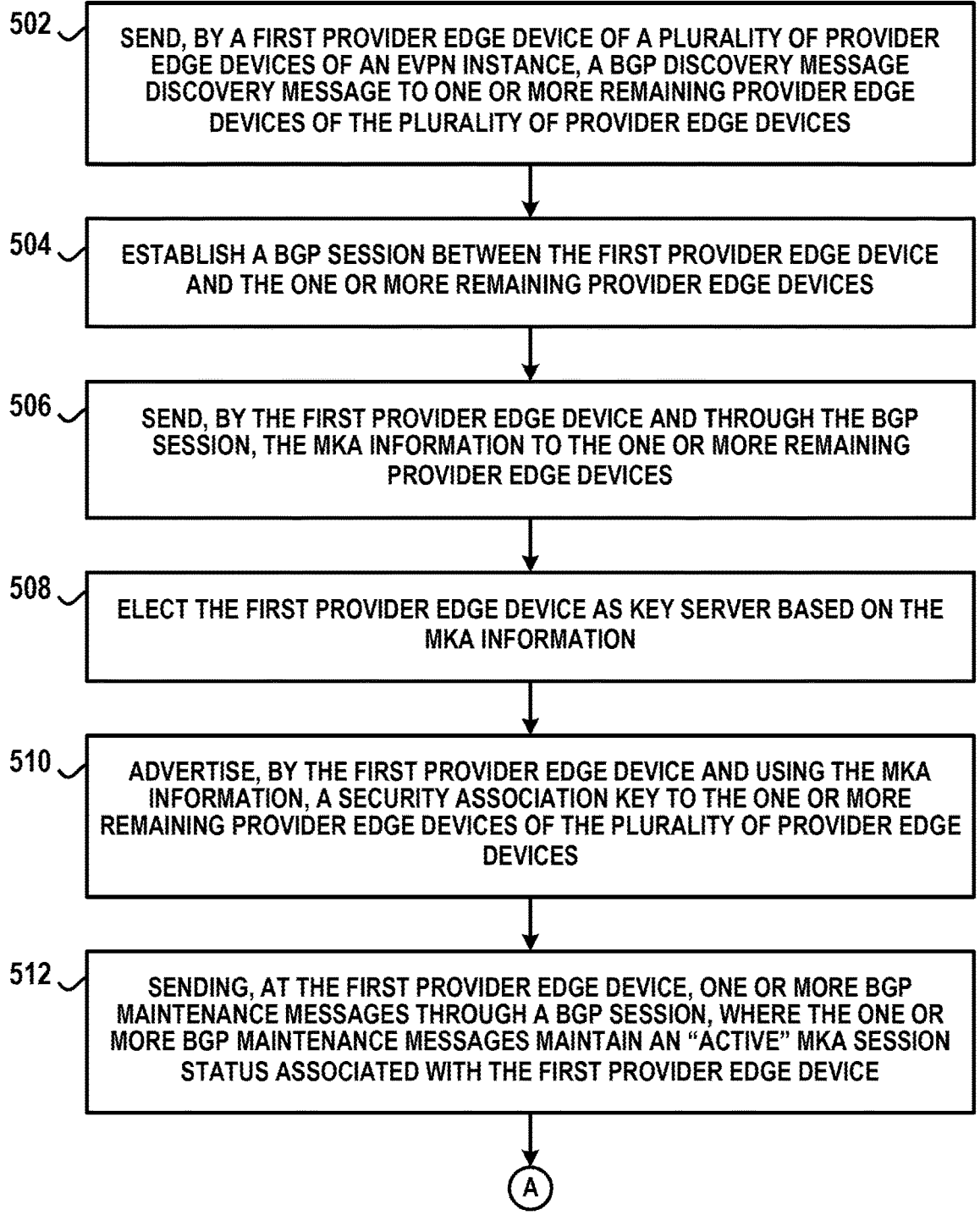
FIGS. 5A and 5B collectively illustrate a method for handling MKA negotiations over BGP framework in accordance with some aspects of the present technology.
Figure 5B:
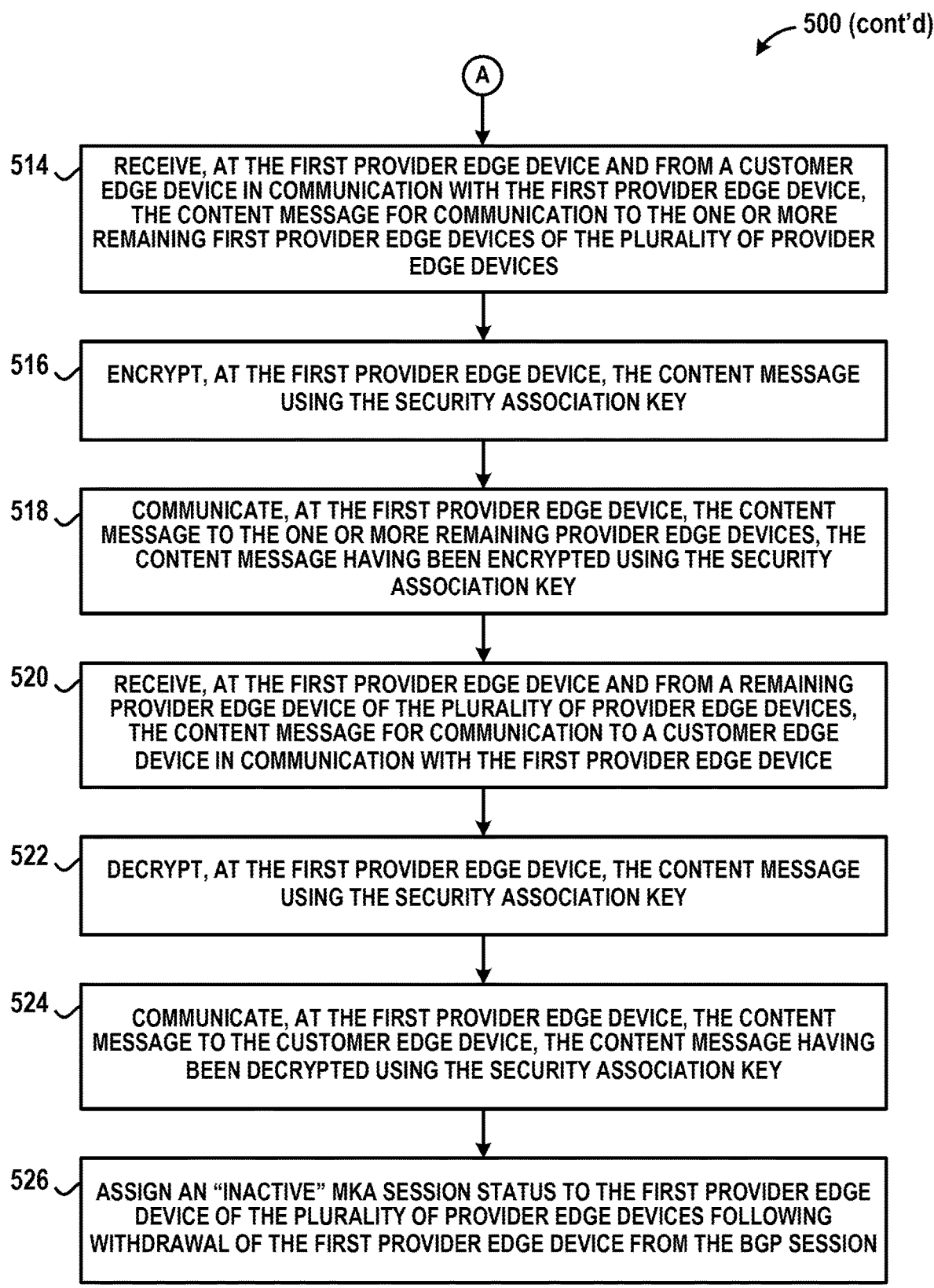

FIGS. 5A and 5B are a pair of process flow diagrams showing a method 500 for establishing and maintaining a multicast connection. The method 500 can be applied using any one or more of the network components described herein with reference to FIGS. 1-2, 3C-4, 6 and 7.

With reference to FIG. 5A, step 502 of method 500 includes sending, by a first provider edge device (e.g., any of PEs 330A-330C of FIG. 3C or any of PEs 430A-430C of FIG. 4) of a plurality of provider edge devices of an EVPN instance, a BGP MKA discovery message to one or more remaining provider edge devices of the plurality of provider edge devices. The first provider edge device can also receive BGP MKA discovery message from one or more remaining provider edge devices. The BGP MKA discovery message can be a BGP prefix advertisement descriptive of a BGP- EVPN route, and includes the MKA information and an address destination associated with the first provider edge device. The BGP-EVPN route including the MKA information can be of route type evpn-mka discussed herein with respect to Tables 1B-1D. Step 504 of method 500 includes establishing a BGP session between the first provider edge device and the one or more remaining provider edge devices. Step 506 of method 500 includes sending the MKA information to one or more remaining provider edge devices by the first provider edge device and through the BGP session. Receipt of the BGP MKA discovery message including the MKA information configures the one or more remaining provider edge devices to perform one or more functionalities associated with a MACsec encryption protocol.

Step 508 of method 500 includes electing the first provider edge device (e.g., first PE 330A of FIGS. 3C-3F or first PE 430A of FIG. 4) as the key server (KS) based on the MKA information. In some examples, KS election can be based on a comparison between a KS priority value associated with the first provider edge device and KS priority values for the remaining provider edge devices. Step 508 can also include setting KS bits of BGP-EVPN routes associated with the first provider edge device to a first value (e.g., "1" or "true") and setting KS bits of BGP-EVPN routes associated with the one or more remaining provider edge devices to a second value (e.g., "0" or "false").

Step 510 of method 500 includes advertising, by the first provider edge device (having been elected as the KS) and using the MKA information, a Security Association Key to the one or more remaining provider edge devices (e.g., second PE 330B or third PE 330C of FIGS. FIG. 3C, second PE 430B or third PE 430C of FIG. 4) of the plurality of provider edge devices. This SAK will be used by each provider edge device of the plurality of provider edge devices for encryption and decryption, and can be generated by an MKA process running on the first provider edge device.

Step 512 of method 500 includes sending, at the first provider edge device, one or more BGP maintenance messages through a BGP session, where the one or more BGP maintenance messages maintain an "active" MKA session status associated with the first provider edge device. As part of BGP protocol, each provider edge device repeatedly sends one or more BGP maintenance messages (e.g., "keepalive" messages) through the BGP session. Importantly, the one or more BGP maintenance messages are used to maintain an "active" MKA session status associated with each respective PE. Until an evpn-mka BGP route is withdrawn, the associated peers can be considered "live" or "active". Step 512 concludes at circle A.

With reference to FIG. 5B, and continuing at circle A, steps 514-518 are directed to a content message encryption functionality of the first provider edge device. Step 514 of method 500 includes receiving, at the first provider edge device and from a customer edge device (e.g., CE1 320A shown in FIG. 3D) in communication with the first provider edge device, the content message for communication to a remaining provider edge device (e.g., PE3 330C shown in FIG. 3D) of the plurality of provider edge devices. Step 516 of method 500 includes encrypting, at the first provider edge device, the content message using the Security Association Key. Step 518 includes communicating, at the first provider edge device, the content message to a remaining provider edge devices, the content message having been encrypted using the Security Association Key.

Steps 520-524 are directed to a content message encryption functionality of the first provider edge device. Step 520 of method 500 includes receiving, at the first provider edge device and from a remaining provider edge device (e.g., PE2 330B shown in FIG. 3D) of the plurality of provider edge devices, the content message for communication to a customer edge device in communication with the first provider edge device. Step 522 of method 500 includes decrypting, at the first provider edge device, the content message using the Security Association Key. Step 524 includes communicating, at the first provider edge device, the content message to the customer edge device, the content message having been decrypted using the Security Association Key.

Step 526 of method 500 includes assigning an "inactive" MKA session status to the first provider edge device of the plurality of provider edge devices following withdrawal of the first provider edge device from the MKA session.

The functions performed in the processes and methods may be implemented in differing order. Furthermore, the outlined steps and operations are provided as examples, and some of the steps and operations may be optional, combined into fewer steps and operations, or expanded into additional steps and operations without detracting from the essence of the disclosed embodiments.

Network Device

Figure 6:
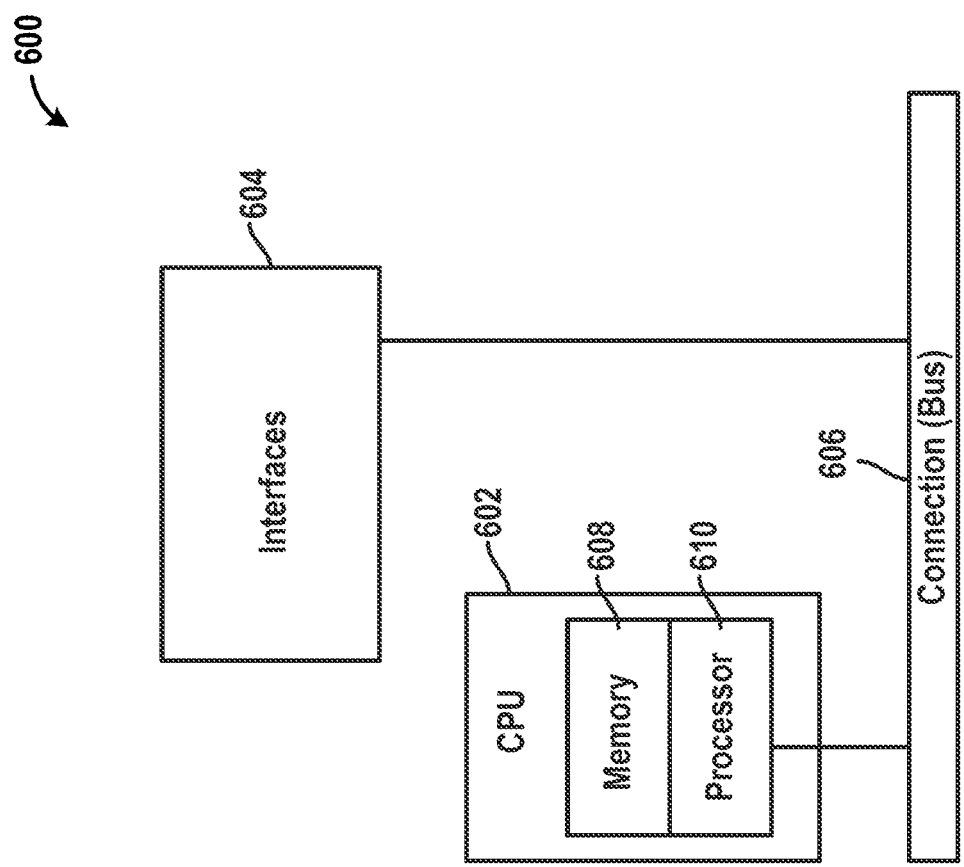
FIG. 6 illustrates an example of a network device according to some aspects of the present technology.

FIG. 6 illustrates an example of a network device, according to some aspects of the present disclosure. Network device 600 can be a network appliance implementing the functionalities of BGP and/or the provider edge devices (e.g., PEs 212, 214, 216, 218 shown in FIG. 2. PEs 330A-330F shown in FIGS. 3C-3F, and PEs 430A-430F shown in FIG. 4), among other components described above with reference to FIGS. 1-5B, such as a controller or other device that implements functionalities of the MPLS network or SR-MPLS network (e.g., MPLS network 162 shown in FIG. 1, MPLS/SR-MPLS network 220 shown in FIG. 2, MPLS/SR-MPLS network 302 shown in FIGS. 3C-3F). The network device 600 can include a master central processing unit (CPU) 602, interfaces 604, and a bus 606 (e.g., a PCI bus). Further, in some examples, the network device 600 can include one or more Application-Specific Integrated Circuits (ASICs) in communication with other components of the network device 600 over bus 606. When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

In the example of FIG. 6, the network device 600 can include a Packet Processing and Forwarding ASIC 612A that performs functionalities associated with receiving, processing, and forwarding packets to connected nodes of a network (e.g., EVPN MPLS/SR-MPLS network 302 in FIGS. 3C-3F). The network device 600 can further include one or more additional ASICs that are dedicated to other tasks, such as a MACsec ASIC 612B that performs functionalities associated with encryption, decryption, and key management.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7:
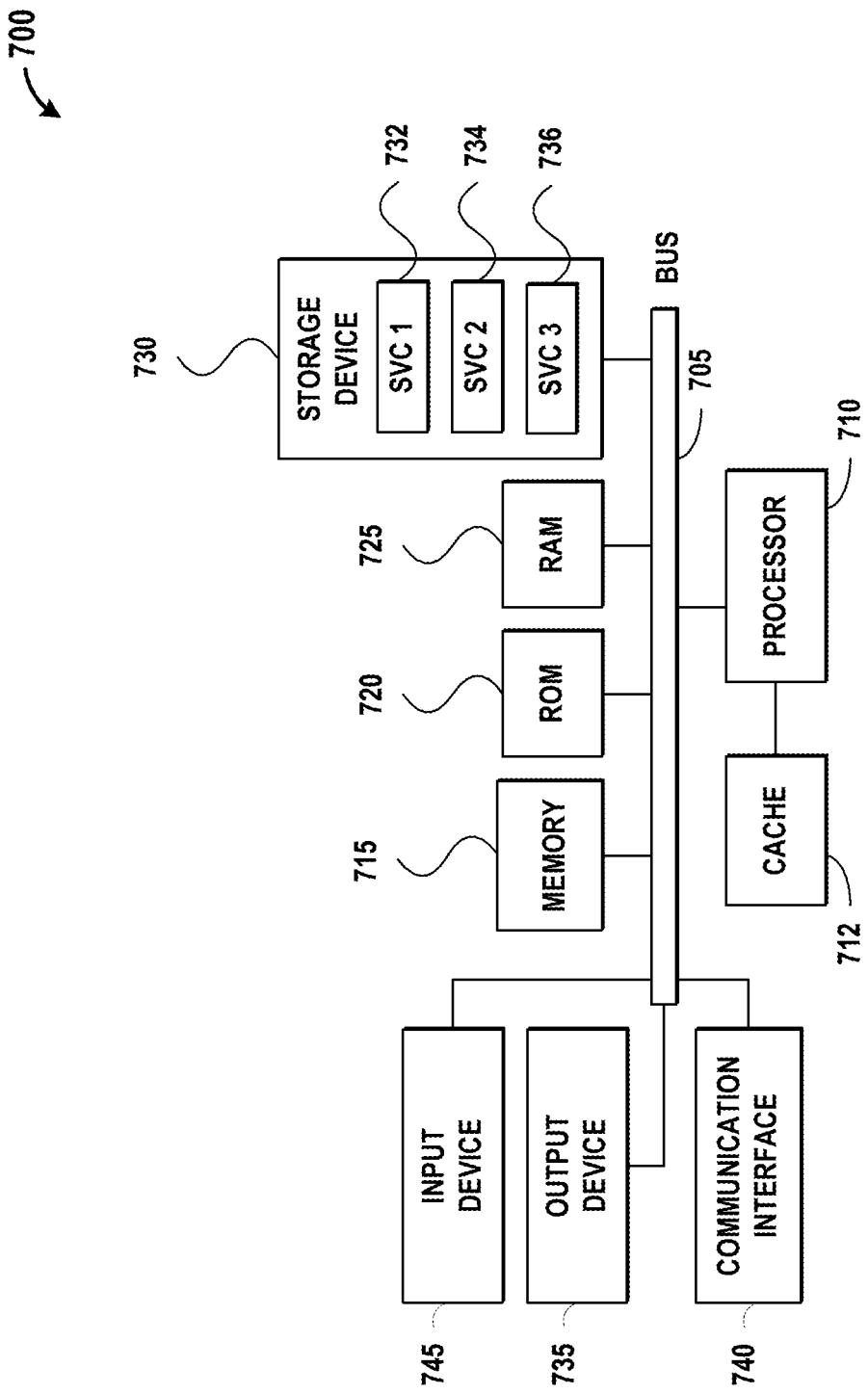
FIG. 7 illustrates an example of a bus computing system according to some aspects of the present technology.

FIG. 7 illustrates an example of a bus computing system, according to some aspects of the present disclosure. Computing system 700 can be utilized as part of any one of the network components described above with reference to FIGS. 1-2, 3C-6. Further, aspects of computing system 700 can be employed to apply aspects of method 500 shown in FIGS. 5A and 5B, which corresponds to various steps and functionalities outlined above with respect to FIGS. 2 and 3C-6. Components of the computing system 700 are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module (services), such as services SVC 1 732, SVC 2 734, and SVC 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software SVCs 732, 734, and 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function. In a further aspect, the memory 715 and/or the storage device 730 can also include network connection processes/services (abbreviated as NC P/S) 716 that includes instructions, which, when executed by the processor 710, cause the processor 710 to implement various functionalities discussed above and shown in FIGS. 2 and 3C-6, including aspects of method 500.

For clarity of explanation, in some instances the various embodiments may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:
sending, by a first provider edge device of a plurality of provider edge devices of an Ethernet Virtual Private Network (EVPN) instance, a Border Gateway Protocol (BGP) MACsec Key Agreement (MKA) discovery message to one or more remaining provider edge devices of the plurality of provider edge devices; the BGP MKA discovery message including MKA information;
advertising, by the first provider edge device and using the MKA information, a Security Association Key to the one or more remaining provider edge devices of the plurality of provider edge devices; and
encrypting or decrypting, at the first provider edge device and using the Security Association Key, a content message received at the first provider edge device.

2. The method of claim 1, further comprising:
establishing a BGP EVPN session between the first provider edge device and the one or more remaining provider edge devices; and
sending, by the first provider edge device and through the BGP EVPN session, the MKA information to the one or more remaining provider edge devices.

3. The method of claim 1, the BGP MKA discovery message being a BGP prefix advertisement descriptive of a BGP-EVPN route including the MKA information and an address destination associated with the first provider edge device.

4. The method of claim 1, where receipt of the BGP MKA discovery message including the MKA information configures the one or more remaining provider edge devices to perform one or more functionalities associated with a MACsec encryption protocol.

5. The method of claim 1, further comprising:
receiving, at the first provider edge device and from a customer edge device in communication with the first provider edge device, the content message for communication to the one or more remaining provider edge devices of the plurality of provider edge devices;
encrypting, at the first provider edge device, the content message using the Security Association Key; and
communicating, at the first provider edge device, the content message to the one or more remaining provider edge devices, the content message having been encrypted using the Security Association Key.

6. The method of claim 1, further comprising:
receiving, at the first provider edge device and from a remaining provider edge device of the plurality of provider edge devices, the content message for communication to a customer edge device in communication with the first provider edge device;
decrypting, at the first provider edge device, the content message using the Security Association Key; and
communicating, at the first provider edge device, the content message to the customer edge device, the content message having been decrypted using the Security Association Key.

7. The method of claim 1, further comprising:
sending, at the first provider edge device, one or more BGP maintenance messages through a BGP EVPN session, where the one or more BGP maintenance messages maintain an "active" MKA session status associated with the first provider edge device.

8. The method of claim 7, further comprising:
assigning an "inactive" MKA session status to the first provider edge device of the plurality of provider edge devices following the withdrawal of the first provider edge device from the BGP EVPN session.

9. A system, comprising:
a first provider edge device of a plurality of provider edge devices of an Ethernet Virtual Private Network (EVPN) instance, comprising:
a processor in communication with a memory and including instructions executable by the processor to:

send a Border Gateway Protocol (BGP) MACsec Key Agreement (MKA) discovery message to one or more remaining provider edge devices of the plurality of provider edge devices, the BGP MKA discovery message including MKA information;

advertise, using the MKA information, a Security Association Key to the one or more remaining provider edge devices of the plurality of provider edge devices; and encrypt or decrypt, using the Security Association Key, a content message received at the first provider edge device.

10. The system of claim 9, the memory further comprising instructions executable by the processor to:

establish a BGP MKA session between the first provider edge device and the one or more remaining provider edge devices; and send, by the first provider edge device and through the BGP EVPN session, the MKA information to the one or more remaining provider edge devices.

11. The system of claim 9, the BGP MKA discovery message being a BGP prefix advertisement descriptive of a BGP-EVPN route including the MKA information and an address destination associated with the first provider edge device.

12. The system of claim 9, where receipt of the BGP MKA discovery message including the MKA information configures the one or more remaining provider edge devices to perform one or more functionalities associated with a MACsec encryption protocol.

13. The system of claim 9, the memory further comprising instructions executable by the processor to:

receive, from a customer edge device in communication with the first provider edge device, the content message for communication to the one or more remaining provider edge devices of the plurality of provider edge devices;

encrypt the content message using the Security Association Key; and communicate the content message to the one or more remaining provider edge devices, the content message having been encrypted using the Security Association Key.

14. The system of claim 9, the memory further comprising instructions executable by the processor to:

receive, from a remaining provider edge device of the plurality of provider edge devices, the content message for communication to a customer edge device in communication with the first provider edge device;

decrypt the content message using the Security Association Key; and communicate the content message to the customer edge device, the content message having been decrypted using the Security Association Key.

15. The system of claim 9, the memory further comprising instructions executable by the processor to:

send one or more BGP maintenance messages through a BGP EVPN session, where the one or more BGP maintenance messages maintain an "active" MKA session status associated with the first provider edge device.

16. The system of claim 9, the memory further comprising instructions executable by the processor to:

assign an "inactive" MKA session status to the first provider edge device of the plurality of provider edge devices upon withdrawal of the first provider edge device from a BGP EVPN session.

17. One or more non-transitory computer-readable media comprising computer-readable instructions, executable by one or more processors of a first provider edge device to:

send a Border Gateway Protocol (BGP) MACsec Key Agreement (MKA) discovery message to one or more remaining provider edge devices of a plurality of provider edge devices, the BGP MKA discovery message including MKA information;

advertise, using the MKA information, a Security Association Key to the one or more remaining provider edge devices of the plurality of provider edge devices; and encrypt or decrypt, using the Security Association Key, a content message received at the first provider edge device.

18. The one or more non-transitory computer-readable media of claim 17, the BGP MKA discovery message being a BGP prefix advertisement descriptive of a BGP-EVPN route including the MKA information and an address destination associated with the first provider edge device.

19. The one or more non-transitory computer-readable media of claim 17, where receipt of the BGP MKA discovery message including the MKA information configures the one or more remaining provider edge devices to perform one or more functionalities associated with a MACsec encryption protocol.

20. The one or more non-transitory computer-readable media of claim 17, further including computer-readable instructions executable by the one or more processors of the first provider edge device to:

send one or more BGP maintenance messages through a BGP EVPN session, where the one or more BGP maintenance messages maintain an "active" MKA session status associated with the first provider edge device.

* * * * *